US009369673B2

(12) United States Patent
Ma et al.

(10) Patent No.: US 9,369,673 B2
(45) Date of Patent: Jun. 14, 2016

(54) METHODS AND SYSTEMS FOR USING A MOBILE DEVICE TO JOIN A VIDEO CONFERENCE ENDPOINT INTO A VIDEO CONFERENCE

(71) Applicant: Blue Jeans Network, Mountain View, CA (US)

(72) Inventors: Luke Ma, Santa Clara, CA (US); Benjamin J. Hutchison, Mountain View, CA (US); Oded Gal, Palo Alto, CA (US); Peter Verwayen, Folsom, CA (US); Alagu Periyannan, Palo Alto, CA (US)

(73) Assignee: Blue Jeans Network, Mountain View, CA (US)

( * ) Notice: Subject to any disclaimer, the term of this patent is extended or adjusted under 35 U.S.C. 154(b) by 0 days.

(21) Appl. No.: 14/217,133

(22) Filed: Mar. 17, 2014

(65) Prior Publication Data
US 2014/0313282 A1   Oct. 23, 2014

Related U.S. Application Data

(63) Continuation-in-part of application No. 13/105,719, filed on May 11, 2011, now Pat. No. 8,885,013.

(60) Provisional application No. 61/794,209, filed on Mar. 15, 2013, provisional application No. 61/798,667, filed on Mar. 15, 2013, provisional application No. 61/803,294, filed on Mar. 19, 2013, provisional application No. 61/803,327, filed on Mar. 19, 2013.

(51) Int. Cl.
*H04N 7/15* (2006.01)
*H04N 7/14* (2006.01)

(52) U.S. Cl.
CPC ............... *H04N 7/152* (2013.01); *H04N 7/141* (2013.01); *H04N 7/155* (2013.01)

(58) Field of Classification Search
CPC ........ H04N 7/141; H04N 7/152; H04N 7/155

USPC ..................... 348/14.01, 14.02, 14.09, 14.13; 370/236; 455/412.2, 416, 415, 426.1, 455/518; 709/217, 204, 205; 725/62; 379/202.01; 715/719, 753; 726/3; 235/375; 382/190
See application file for complete search history.

(56) References Cited

U.S. PATENT DOCUMENTS

| | | | |
|---|---|---|---|
| 4,455,455 | A | 6/1984 | Little |
| 5,530,472 | A | 6/1996 | Bregman et al. |

(Continued)

FOREIGN PATENT DOCUMENTS

| | | |
|---|---|---|
| DE | 10358846 A1 | 7/2005 |
| EP | 0955765 A1 | 11/1999 |

(Continued)

OTHER PUBLICATIONS

Amendment filed Jul. 9, 2014, from U.S. Appl. No. 13/105,684 (filed May 11, 2010), 9 pgs.

(Continued)

*Primary Examiner* — Gerald Gauthier
(74) *Attorney, Agent, or Firm* — Ascenda Law Group, PC

(57) ABSTRACT

Described herein are methods and systems for joining a video conference endpoint to a video conference. A user may use a mobile device to take a picture of a Quick Response (QR) code or may place the mobile device in close proximity to a Near Field Communication (NFC) tag. Such QR code or NFC tag may be associated with a video conference endpoint. The user may then transmit the information encoded by the QR code or NFC tag, along with a meeting identifier, to a server. The server, in turn, may instruct a video conference endpoint identified by the QR code or NFC tag to join a video conference identified by the meeting identifier.

14 Claims, 5 Drawing Sheets

(56) References Cited

U.S. PATENT DOCUMENTS

| | | | |
|---|---|---|---|
| 5,657,096 A | 8/1997 | Lukacs | |
| 5,867,579 A | 2/1999 | Saito | |
| 5,959,662 A | 9/1999 | Shaffer et al. | |
| 6,069,952 A | 5/2000 | Saito et al. | |
| 6,075,571 A | 6/2000 | Kuthyar et al. | |
| 6,330,022 B1 | 12/2001 | Seligmann | |
| 6,449,717 B1 | 9/2002 | Saito | |
| 6,584,077 B1 | 6/2003 | Polomski | |
| 6,693,663 B1 | 2/2004 | Harris | |
| 6,750,896 B2 | 6/2004 | McClure | |
| 6,831,676 B2 | 12/2004 | Monroe | |
| 6,873,654 B1 | 3/2005 | Rackett | |
| 6,972,786 B1 | 12/2005 | Ludwig | |
| 7,085,243 B2 | 8/2006 | Decker et al. | |
| 7,174,365 B1 | 2/2007 | Even et al. | |
| 7,362,349 B2 | 4/2008 | Nelson et al. | |
| 7,477,282 B2 | 1/2009 | Firestone et al. | |
| 7,499,075 B2 | 3/2009 | Miceli | |
| 7,577,420 B2 | 8/2009 | Srinivasan et al. | |
| 7,599,682 B2* | 10/2009 | Takeda et al. | 455/415 |
| 7,620,393 B2* | 11/2009 | Venkitaraman et al. | 455/426.1 |
| 7,675,858 B2* | 3/2010 | Dekeyzer et al. | 370/236 |
| 7,800,642 B2 | 9/2010 | Eshkoli et al. | |
| 7,830,824 B2 | 11/2010 | Decker et al. | |
| 7,844,260 B2* | 11/2010 | Nguyen et al. | 455/416 |
| 8,060,225 B2 | 11/2011 | Hans et al. | |
| 8,150,920 B2* | 4/2012 | Forstadius | 709/205 |
| 8,214,242 B2 | 7/2012 | Agapi et al. | |
| 8,259,155 B2 | 9/2012 | Marathe et al. | |
| 8,289,365 B2 | 10/2012 | De Lind Van Wijngaarden et al. | |
| 8,300,789 B2 | 10/2012 | Shah et al. | |
| 8,316,104 B2 | 11/2012 | Galvez et al. | |
| 8,391,843 B2* | 3/2013 | Lee et al. | 455/412.2 |
| 8,405,701 B2 | 3/2013 | De Lind Van Wijngaarden et al. | |
| 8,416,715 B2 | 4/2013 | Rosenfeld et al. | |
| 8,464,163 B2 | 6/2013 | Heikes et al. | |
| 8,482,593 B2 | 7/2013 | Periyannan et al. | |
| 8,483,098 B2 | 7/2013 | Vadlakonda et al. | |
| 8,484,705 B2 | 7/2013 | Hoppe et al. | |
| 8,503,654 B1 | 8/2013 | Ludwig | |
| 8,514,263 B2 | 8/2013 | Periyannan et al. | |
| 8,558,864 B1* | 10/2013 | Koller et al. | 348/14.01 |
| 8,595,296 B2 | 11/2013 | Berberian et al. | |
| 8,659,639 B2 | 2/2014 | Baldino et al. | |
| 8,692,862 B2 | 4/2014 | N'Guessan | |
| 9,002,974 B1* | 4/2015 | Dhanoa et al. | 709/217 |
| 2002/0099634 A1 | 7/2002 | Coutts et al. | |
| 2002/0126201 A1 | 9/2002 | Schmitt et al. | |
| 2002/0159394 A1 | 10/2002 | Decker et al. | |
| 2002/0169592 A1 | 11/2002 | Aityan | |
| 2003/0009342 A1 | 1/2003 | Haley | |
| 2004/0030749 A1 | 2/2004 | Bowman-Amuah | |
| 2004/0236830 A1 | 11/2004 | Nelson et al. | |
| 2005/0034079 A1 | 2/2005 | Gunasekar et al. | |
| 2005/0195899 A1 | 9/2005 | Han | |
| 2006/0029129 A1 | 2/2006 | Hannuksela | |
| 2006/0032486 A1 | 2/2006 | Prasad | |
| 2006/0083244 A1 | 4/2006 | Jagadesan et al. | |
| 2006/0235927 A1 | 10/2006 | Bhakta et al. | |
| 2006/0294186 A1* | 12/2006 | Nguyen et al. | 709/204 |
| 2007/0064901 A1 | 3/2007 | Baird et al. | |
| 2007/0111743 A1* | 5/2007 | Leigh et al. | 455/518 |
| 2007/0127668 A1 | 6/2007 | Ahya et al. | |
| 2007/0156813 A1 | 7/2007 | Galvez et al. | |
| 2007/0165106 A1 | 7/2007 | Groves et al. | |
| 2007/0206089 A1 | 9/2007 | Eshkoli et al. | |
| 2007/0206673 A1 | 9/2007 | Cipolli et al. | |
| 2007/0242680 A1 | 10/2007 | Signaoff et al. | |
| 2007/0242694 A1 | 10/2007 | Signaoff et al. | |
| 2007/0263824 A1* | 11/2007 | Bangalore et al. | 379/202.01 |
| 2007/0285503 A1 | 12/2007 | Asthana et al. | |
| 2007/0286388 A1* | 12/2007 | Vaught et al. | 379/202.01 |
| 2008/0068449 A1 | 3/2008 | Wu et al. | |
| 2008/0075095 A1 | 3/2008 | Suryanarayana et al. | |
| 2008/0120675 A1 | 5/2008 | Morad et al. | |
| 2008/0165864 A1 | 7/2008 | Eleftheriadis et al. | |
| 2008/0209516 A1* | 8/2008 | Nassiri | 726/3 |
| 2008/0313278 A1 | 12/2008 | Hochberg | |
| 2009/0003436 A1 | 1/2009 | Levin et al. | |
| 2009/0003439 A1 | 1/2009 | Wang et al. | |
| 2009/0015660 A1* | 1/2009 | Vedantham et al. | 348/14.09 |
| 2009/0015661 A1 | 1/2009 | King et al. | |
| 2009/0016447 A1 | 1/2009 | Chen et al. | |
| 2009/0067507 A1 | 3/2009 | Baird et al. | |
| 2009/0157469 A1* | 6/2009 | D'Urso et al. | 705/9 |
| 2009/0204906 A1 | 8/2009 | Irving | |
| 2009/0210789 A1 | 8/2009 | Thakkar et al. | |
| 2010/0005497 A1 | 1/2010 | Maresca | |
| 2010/0008419 A1 | 1/2010 | Wu et al. | |
| 2010/0022225 A1 | 1/2010 | Benger et al. | |
| 2010/0085419 A1 | 4/2010 | Goyal et al. | |
| 2010/0283829 A1 | 11/2010 | De Beer et al. | |
| 2010/0315480 A1 | 12/2010 | Kahn | |
| 2011/0025816 A1* | 2/2011 | Brewer et al. | 348/14.02 |
| 2011/0221860 A1* | 9/2011 | Rideout | 348/14.09 |
| 2011/0246172 A1 | 10/2011 | Liberman et al. | |
| 2011/0279634 A1 | 11/2011 | Periyannan et al. | |
| 2011/0279635 A1 | 11/2011 | Periyannan et al. | |
| 2011/0279636 A1 | 11/2011 | Periyannan et al. | |
| 2011/0279637 A1 | 11/2011 | Periyannan et al. | |
| 2011/0279638 A1 | 11/2011 | Periyannan et al. | |
| 2011/0279639 A1 | 11/2011 | Anand et al. | |
| 2011/0283203 A1 | 11/2011 | Periyannan et al. | |
| 2012/0056971 A1* | 3/2012 | Kumar et al. | 348/14.02 |
| 2012/0066596 A1* | 3/2012 | Feng et al. | 715/719 |
| 2012/0066722 A1* | 3/2012 | Cheung et al. | 725/62 |
| 2012/0082226 A1 | 4/2012 | Weber | |
| 2012/0242776 A1 | 9/2012 | Tucker et al. | |
| 2013/0061062 A9 | 3/2013 | Saito | |
| 2013/0136363 A1* | 5/2013 | Na | G06F 17/30047 382/190 |
| 2013/0212286 A1 | 8/2013 | Krishnakumar et al. | |
| 2013/0342637 A1 | 12/2013 | Felkai et al. | |
| 2013/0342640 A1* | 12/2013 | Li et al. | 348/14.13 |
| 2014/0028778 A1 | 1/2014 | Shapiro et al. | |
| 2014/0092203 A1 | 4/2014 | Periyannan et al. | |
| 2014/0098180 A1 | 4/2014 | Periyannan et al. | |
| 2014/0209671 A1* | 7/2014 | Finlow-Bates | G06K 7/1417 235/375 |
| 2014/0313282 A1* | 10/2014 | Ma et al. | 348/14.09 |
| 2014/0317532 A1* | 10/2014 | Ma | G06F 9/4443 715/753 |

FOREIGN PATENT DOCUMENTS

| | | |
|---|---|---|
| EP | 1830568 A2 | 9/2007 |
| GB | 2349055 A | 10/2000 |
| WO | WO 94/24803 A1 | 10/1994 |

OTHER PUBLICATIONS

Amendment filed Dec. 22, 2014, from U.S. Appl. No. 13/105,684 (filed May 11, 2010), 12 pgs.

Amendment filed Mar. 25, 2014, from U.S. Appl. No. 13/105,684 (filed May 11, 2010), 13 pgs.

Final Office Action dated Apr. 9, 2014, from U.S. Appl. No. 13/105,684 (filed May 11, 2010), 16 pgs.

Office Action dated Jul. 22, 2014, from U.S. Appl. No. 13/105,684 (filed May 11, 2010), 15 pgs.

Office Action dated Nov. 25, 2013, from U.S. Appl. No. 13/105,684 (filed May 11, 2010), 16 pgs.

Notice of Allowance dated Jan. 16, 2015, from U.S. Appl. No. 13/105,684 (filed May 11, 2010), 8 pgs.

Notice of Allowance dated Mar. 7, 2013, from U.S. Appl. No. 13/105,691 (filed May 11, 2011), 13 pgs.

Final Office Action dated Apr. 29, 2015, from U.S. Appl. No. 13/919,576 (filed Jun. 17, 2013), 10 pgs.

Amendment filed Mar. 24, 2015, from U.S. Appl. No. 13/919,576 (filed Jun. 17, 2013), 8 pgs.

Office Action dated Dec. 26, 2014, from U.S. Appl. No. 13/919,576 (filed Jun. 17, 2013), 9 pgs.

Notice of Allowance dated Apr. 29, 2015, from U.S. Appl. No. 13/251,913 (filed Oct. 3, 2011), 8 pgs.

(56) References Cited

OTHER PUBLICATIONS

Amendment filed Mar. 23, 2015, from U.S. Appl. No. 13/251,913 (filed Oct. 3, 2011), 9 pgs.
Office Action dated Dec. 22, 2014, from U.S. Appl. No. 13/251,913 (filed Oct. 3, 2011), 17 pgs.
Amendment filed Jul. 16, 2014, from U.S. Appl. No. 13/251,913 (filed Oct. 3, 2011), 10 pgs.
Final Office Action dated Apr. 17, 2014, from U.S. Appl. No. 13/251,913 (filed Oct. 3, 2011), 11 pgs.
Amendment filed Mar. 26, 2014, from U.S. Appl. No. 13/251,913 (filed Oct. 3, 2011), 15 pgs.
Office Action dated Sep. 26, 2013, from U.S. Appl. No. 13/251,913 (filed Oct. 3, 2011), 14 pgs.
Notice of Allowance dated Apr. 18, 2013, from U.S. Appl. No. 13/105,699 (filed May 11, 2011), 16 pgs.
Amendment filed Mar. 3, 2015, from U.S. Appl. No. 13/955,646 (filed Jul. 31, 2013), 6 pgs.
Office Action dated Dec. 3, 2014, from U.S. Appl. No. 13/955,646 (filed Jul. 31, 2013), 9 pgs.
Notice of Allowance dated Jan. 23, 2015, from U.S. Appl. No. 13/105,704 (filed May 11, 2011), 7 pgs.
Response filed Jan. 16, 2015, from U.S. Appl. No. 13/105,704 (filed May 11, 2011), 2 pgs.
Final Office Action dated Sep. 18, 2014, from U.S. Appl. No. 13/105,704 (filed May 11, 2011), 8 pgs.
Amendment filed Sep. 10, 2014, from U.S. Appl. No. 13/105,704 (filed May 11, 2011), 7 pgs.
Final Office Action dated Jun. 10, 2014, from U.S. Appl. No. 13/105,704 (filed May 11, 2011), 10 pgs.
Amendment filed May 28, 2014, from U.S. Appl. No. 13/105,704 (filed May 11, 2011), 4 pgs.
Office Action dated Feb. 27, 2014, from U.S. Appl. No. 13/105,704 (filed May 11, 2011), 11 pgs.
Notice of Allowance dated Jun. 25, 2014, from U.S. Appl. No. 13/105,716 (filed May 11, 2011), 5 pgs.
Amendment filed May 28, 2014, from U.S. Appl. No. 13/105,716 (filed May 11, 2011), 7 pgs.
Office Action mailed Jan. 28, 2014, from U.S. Appl. No. 13/105,716 (filed May 11, 2011), 11 pp.
Notice of Allowance dated Jul. 9, 2014, from U.S. Appl. No. 13/105,719 (filed May 11, 2011), 9 pgs.
Amendment filed Jun. 25, 2014, from U.S. Appl. No. 13/105,719 (filed May 11, 2011), 10 pgs.
Office Action dated Feb. 26, 2014, from U.S. Appl. No. 13/105,719 (filed May 11, 2011), 13 pgs.
Amendment filed May 11, 2015, from U.S. Appl. No. 13/105,723 (filed May 11, 2011), 7 pgs.
Final Office Action dated Feb. 11, 2015, from U.S. Appl. No. 13/105,723 (filed May 11, 2011), 12 pgs.
Amendment filed Jan. 13, 2015, from U.S. Appl. No. 13/105,723 (filed May 11, 2011), 6 pgs.
Office Action dated Aug. 13, 2014, from U.S. Appl. No. 13/105,723 (filed May 11, 2011), 10 pgs.
Amendment filed Jul. 25, 2014, from U.S. Appl. No. 13/105,723 (filed May 11, 2011), 8 pgs.
Final Office Action dated Apr. 25, 2014, from U.S. Appl. No. 13/105,723 (filed May 11, 2011), 10 pgs.
Amendment filed Feb. 27, 2014, from U.S. Appl. No. 13/105,723 (filed May 11, 2011), 8 pgs.
Office Action dated Sep. 5, 2013, from U.S. Appl. No. 13/105,723 (filed May 11, 2011), 8 pgs.

International Search Report, Patent Cooperation Treaty International Searching Authority (Aug. 19, 2011), PCT/US2011/036247, 4 Pgs.
International Search Report, Patent Cooperation Treaty International Searching Authority (Aug. 19, 2011), PCT/US2011/036257, 4 Pgs.
International Search Report, Patent Cooperation Treaty International Searching Authority (Aug. 19, 2011), PCT/US2011/036263, 4 Pgs.
International Search Report, Patent Cooperation Treaty International Searching Authority (Aug. 19, 2011), PCT/US2011/036266, 4 Pgs.
Written Opinion of the International Searching Authority, Patent Cooperation Treaty International Searching Authority (Aug. 19, 2011), PCT/US2011/036247, 4 Pgs.
Written Opinion of the International Searching Authority, Patent Cooperation Treaty International Searching Authority (Aug. 19, 2011), PCT/US2011/036257, 4 Pgs.
Written Opinion of the International Searching Authority, Patent Cooperation Treaty International Searching Authority (Aug. 19, 2011), PCT/US2011/036263, 4 Pgs.
Written Opinion of the International Searching Authority, Patent Cooperation Treaty International Searching Authority (Aug. 19, 2011), PCT/US2011/036266, 7 Pgs.
International Search Report, Patent Cooperation Treaty International Searching Authority (Jan. 13, 2012), PCT/US2011/054709, 3 Pgs.
Written Opinion of the International Searching Authority, Patent Cooperation Treaty International Searching Authority (Jan. 13, 2012), PCT/US2011/054709, 5 Pgs.
Amendment under Rule 161 filed Jun. 28, 2013, for EP Application No. 11721197.9 (filed May 12, 2011), 15 pgs.
Examination Report dated Aug. 6, 2014, from the European Patent Office for EP Application No. 11721197.9 (filed May 12, 2011), 5 pgs.
Response to Examination Report filed May 12, 2015, for EP Application No. 11721197.9 (filed May 12, 2011), 16 pgs.
Amendment under Rule 161 filed Jul. 18, 2013, for EP Application No. 11721199.5 (filed May 12, 2011), 15 pgs.
Examination Report dated Aug. 6, 2014, from the European Patent Office for EP Application No. 11721199.5 (filed May 12, 2011), 5 pgs.
Response to Examination Report filed May 7, 2015, for EP Application No. 11721199.5 (filed May 12, 2011), 14 pgs.
Amendment under Rule 161 filed Jul. 19, 2013, for EP Application No. 11722956.7 (filed May 12, 2011), 16 pgs.
Examination Report dated Aug. 6, 2014, from the European Patent Office for EP Application No. 11722956.7 (filed May 12, 2011), 5 pgs.
Response to Examination Report filed Apr. 14, 2015, for EP Application No. 11722956.7 (filed May 12, 2011), 15 pgs.
Amendment under Rule 161 filed Jul. 22, 2013, for EP Application No. 11722955.9 (filed May 12, 2011), 16 pgs.
Examination Report dated Aug. 6, 2014, from the European Patent Office for EP Application No. 11722955.9 (filed May 12, 2011), 4 pgs.
Amendment under Rule 161 filed Nov. 25, 2013, for EP Application No. 11768260.9 (filed May 12, 2011), 11 pgs.
Response to Examination Report filed May 21, 2015, for EP Application No. 11722955.9 (filed May 12, 2011), 16 pgs.
Notice of Allowance dated Sep. 18, 2015, from U.S. Appl. No. 13/955,646 (filed Jul. 31, 2013), 12 pgs.
Response filed Aug. 21, 2015, from U.S. Appl. No. 13/955,646 (filed Jul. 31, 2013), 5 pgs.
Final Office Action dated Jun. 23, 2015, from U.S. Appl. No. 13/955,646 (filed Jul. 31, 2013), 13 pgs.

\* cited by examiner

METHODS AND SYSTEMS FOR USING A MOBILE DEVICE TO JOIN A VIDEO CONFERENCE ENDPOINT INTO A VIDEO CONFERENCE

CROSS REFERENCE TO RELATED APPLICATIONS

This application is a NON-PROVISIONAL of, claims priority to, and incorporates by reference in its entirety U.S. Provisional Application Nos. 61/794,209 and 61/798,667, both filed on Mar. 15, 2013, and U.S. Provisional Application Nos. 61/803,294 and 61/803,327, both filed on Mar. 19, 2013. This application is also a CONTINUATION-IN-PART of U.S. patent application Ser. No. 13/105,719, filed on May 11, 2011, entitled "Systems and Methods for Novel Interactions with Participants in Videoconference Meetings", which is also incorporated herein by reference in its entirety.

FIELD OF THE INVENTION

One embodiment of the present invention relates to methods and systems for assisting a user to more easily join a video conference endpoint to a video conference. Another embodiment of the present invention relates to methods and systems for assisting a user to deploy a plurality of electronic devices as a single video conference endpoint.

BACKGROUND

In joining a video conference endpoint (specifically a room conference system) into a video conference, a user must typically manipulate a specialized control device of the video conference endpoint (i.e., a control device specifically adapted to operate/control the video conference endpoint), such as a remote control or touch panel. Many users, however, are not familiar with how to use such specialized control devices.

SUMMARY

An object of one embodiment of the present invention is to allow a user to control a room conference system without the use of a specialized control device of the room conference system.

Another object of one embodiment of the present invention is to allow a user to join a room conference system into a video conference by performing a short sequence of commands on a personal mobile device (e.g., mobile phone, laptop computer, etc. of the user), rather than using the specialized control device of the room conference system.

These and further embodiments of the present invention are discussed herein.

BRIEF DESCRIPTION OF THE DRAWINGS

The present invention is illustrated by way of example, and not limitation, in the figures of the accompanying drawings in which.

DETAILED DESCRIPTION

Figure 1:
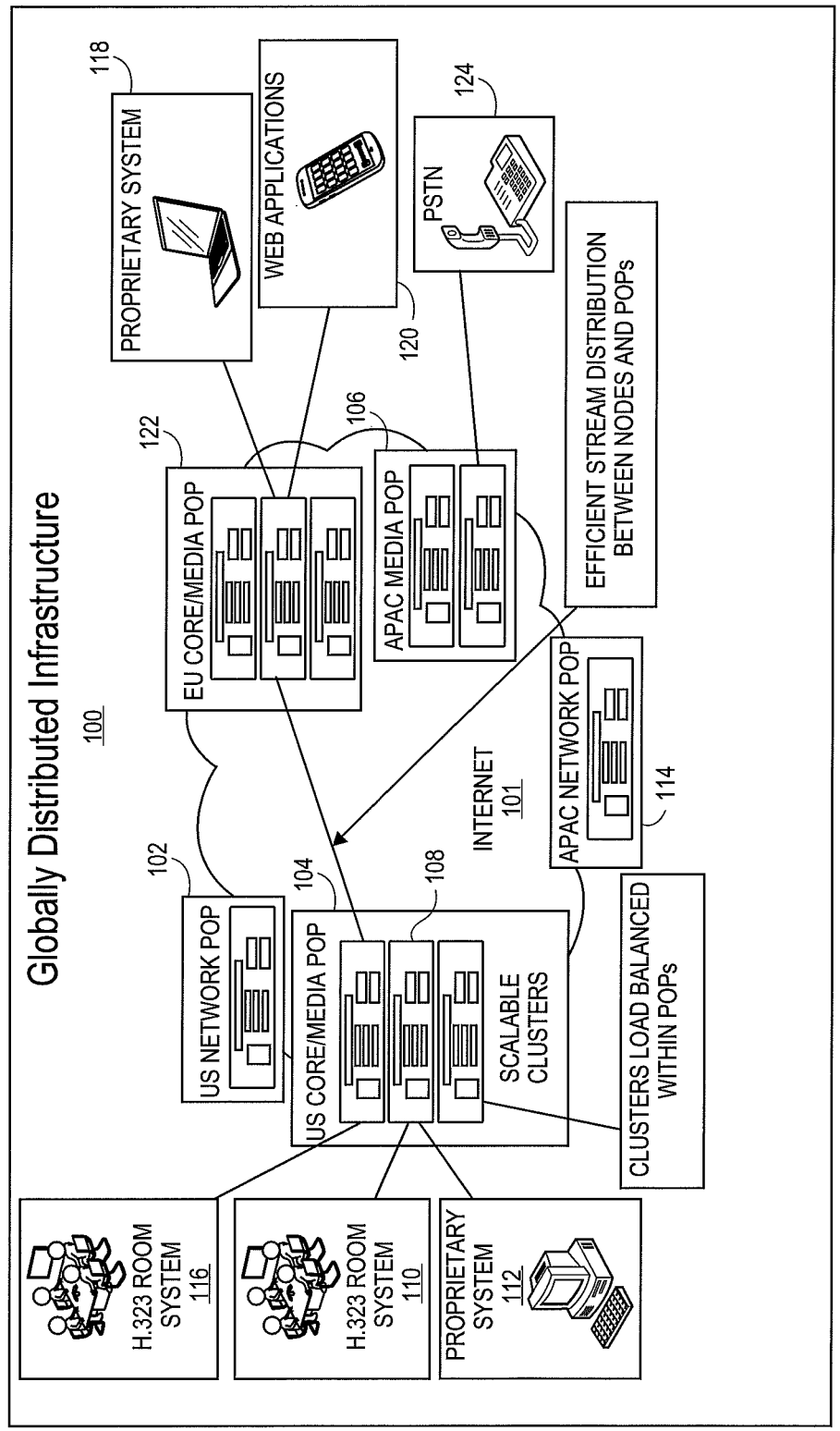
FIG. 1 depicts an exemplary video conference system, in accordance with some embodiments of the invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The video conference system configured in accordance with some embodiments of the present invention may provide a user interface for presentation of the received data streams for a video conference. In some embodiments, the video conference system may support the operation of a video conference, such as a conference with a virtual media room or virtual meeting room (VMR) user interface, wherein each VMR user interface may present data from a plurality of endpoints (e.g., devices of participants in the video conference) at one or more geographic locations. Examples of approaches to video conference systems that may be practiced in some embodiments are provided in U.S. patent application Ser. No. 13/105,691, entitled "Systems and Methods for Scalable Composition of Media Streams for Real-Time Multimedia Communication," filed on May 11, 2011 (issued as U.S. Pat. No. 8,482,593 on Jul. 9, 2013), U.S. patent application Ser. No. 13/105,684, entitled "Systems and Methods for Real-time Multimedia Communications Across Multiple Standards and Proprietary Devices," filed on May 11, 2011, U.S. patent application Ser. No. 13/919,576, entitled "Systems and Methods for Scalable Composition of Media Streams for Real-time Multimedia Communication," filed on Jun. 17, 2013, U.S. patent application Ser. No. 13/105,699, entitled "Systems and Methods for Scalable Distributed Global Infrastructure for Real-time Multimedia Communication," filed on May 11, 2011 (issued as U.S. Pat. No. 8,514,263 on Aug. 20, 2013), U.S. patent application Ser. No. 13/955,646, entitled "Systems and Methods for Scalable Distributed Global Infrastructure for Real-time Multimedia Communication," filed on Jul. 31, 2013, U.S. patent application Ser. No. 13/105,704, entitled "Systems and Methods for Security and Privacy Controls for Videoconferencing," filed on May 11, 2011, U.S. patent application Ser. No. 13/105,716, entitled "Systems and Methods for Shared Multimedia Experiences in Virtual Videoconference Rooms," filed on May 11, 2011, U.S. patent application Ser. No. 13/105,719, entitled "Systems and Methods for Novel Interactions with Participants in Videoconference Meetings," filed on May 11, 2011, U.S. patent application Ser. No. 13/105,723, entitled "Systems and Methods for Real-time Virtual-reality Immersive Multimedia Communications," filed on May 11, 2011, and U.S. patent application Ser. No. 13/251,913, entitled "Systems and Methods for Error Resilient Scheme for Low Latency H.264 Video Coding," filed on Oct. 3, 2011, each incorporated herein by reference in its respective entirety.

The video conference system is described in more detail with reference to FIGS. 1 and 2, and, as illustrated, may support a variety of video conferencing feeds of audio, video, audio and video, and/or other media data streams from video conferencing participant endpoints to present a video conference. Endpoints may be any type of device, including, but not limited to: laptops, computers, smartphones, tablets, phones, audio and video conferencing system devices, and/or any other device capable of sending and receiving data streams over a network. Participants may use proprietary or standards-based communication protocols with their devices, and the video conference system may enable a multi-party and/or point-to-point (e.g., between two endpoints) video conference session among the plurality of participant endpoints.

As a non-limiting example, video data streams from proprietary video conference endpoints using proprietary communication protocols implemented for client applications include, but are not limited to, the following: Microsoft Skype application, Polycom video conference applications, Microsoft Lync applications, Google Talk applications, web applications capable of real time communication, and/or any other application providing communication services. Video data streams from standards-based video conference endpoints, include, but are not limited to, H.323 and Session Initiation Protocol (SIP). Additionally, the video conference system may support data streams from a media gateway that converts digital media streams between disparate telecommunication networks, such as from devices using public switched telephone networks (PSTN), SS7, and Next Generation Networks. Each video conference can be implemented and supported across an infrastructure of a globally distributed set of commodity servers acting as media processing nodes co-located in Points of Presence (POPs) for Internet access, wherein such a distributed architecture can support thousands of simultaneously active video conferences in a reservation-less manner and that is transparent to the user participants. Each video conference provides users with a rich set of conferencing and collaboration interaction.

These interactions encompass the control of a video conference session, its configuration, the visual layout of the data streams from the conference participants, customization of the user interface, and adaptation of a video conference to integrate with and present data streams from different client applications (e.g., chat, whiteboards, Microsoft Skype, etc.). For a non-limiting example, one such use of the video conference system is to facilitate conferences between two disparate endpoints such as a client application for a proprietary system from a communication service provider (e.g., a Skype client) and an application for a standards-based H.323 endpoint. Continuing with the example, the Skype user may initiate a video conference with another user and have no knowledge of the other user's endpoint technology (e.g., client application), and the video conference system may host a video conference session and instantiate media processing components/elements to translate data streams (as needed), transcode data streams (as needed), and create a composite of data streams received from the disparate endpoints.

A globally distributed infrastructure for the video conference system supports the sharing of the event (e.g., the session) among the participants at geographically distributed locations with the use of a plurality of MCUs (Multipoint Control Units), each configured to process the plurality of audio and/or video streams from the plurality of video conference endpoints in real time. Those with skill in the art will recognize that a globally distributed infrastructure is not required to practice the invention. A geographically distributed architecture and/or simply a distributed architecture may be implemented to practice the invention.

Compared to conventional video conference system approaches that require every participant to the video conference to follow the same communication standard or protocol and/or use the same client application from a communication service provider, a video conference supported by the globally distributed infrastructure with at least one MCU at a media server allows the participants of a video conference to participate in a multi-party or point-to-point video conference session in device, address scheme, protocol, and/or communication service provider independent fashion. By conducting manipulation of the video and audio streams transparently in on a remote server (e.g., a server of a POP that is accessible via one or more networks or networks of networks) without end user involvement, the proposed approach brings together video conference systems and applications of different devices, different protocols of video conferencing, and/or different communication services from communication service providers as one integrated system. Communication service providers may include, but are not limited to, the following: providers of Voice over Internet Protocol (VoIP), instant messaging services supporting voice and/or data, and/or service provider with applications that allow for transport of information electronically.

In particular, the video conference system provides the integration of services from different communication service providers (e.g., Skype, and Google Talk) that support different addressing schemes for identifying users on devices. For example, a participant user may login to a Skype client to join a video conference using a communication service identifier (e.g., username, Skype id) and communicate with a participant user who logins to a Google Talk client using an email address. Ordinarily, a communication service provider may require a user to identify each participant on the communication session with an identifier registered with the communication service (e.g., communication service identifier, email address, username, etc.), so that the communication service provider may look up the address of the user endpoint to communicate, and the communication service provider may not support integration with other communication services. The video conference system integrates with the communication service provider services/system seamlessly for the user, so that the user can login with any client application with an identifier registered with the communication service provider and participate in the video conference.

In some embodiments, the endpoint for a participant using a client application is communicating with a corresponding client application for the communication service provider executing as a virtual client application on a server in the backend. A virtual client application is a client application that may be executed on a server of the video conference system to receive data streams from the client application executing on a participant endpoint device, and the output or presentation of the data streams within the virtual client application may be captured and combined with other data streams to form a composite for the video conference. Examples of approaches to video conference systems that support different communication services are provided in U.S. patent application Ser. No. 13/105,684, entitled "Systems and Methods for Real-Time Multimedia Communication across multiple standards and proprietary devices" filed on May 11, 2011, incorporated herein by reference in its entirety.

Hosting the video conference on at least one media server accessible on a network (e.g., Internet/cloud) allows for the participants to initiate a video conference with any device, supporting any communication protocol, and any client application from a communication service provider, have the system communicate with the other participants at each of their selected endpoint devices, and the other participants may accept the request to join the video conference from any endpoint device using any client application from any communication service provider that he/she wishes. A video conference hosted on a server accessible over the Internet/cloud enables any participant to be able to upload media content to a server (i.e., a node) of the global distributed infrastructure accessible over the Internet (e.g., in the cloud) and have it be retransmitted to other participants in formats of their choice transparently, with or without modifications.

Distributed Infrastructure

FIG. 1 depicts an exemplary system, in accordance with some embodiments of the invention. As shown in FIG. 1, to support the operations of video conferencing, one or more media processing nodes (known in the industry as an MCU) (e.g., nodes of 102, 104, 106, 114, and 122) are used to process and compose video conference feeds from various endpoints, and in particular, the media processing nodes of the globally distributed infrastructure 100 are able to offer a multi-protocol bridging solution to deliver content to disparate endpoints. In the example of FIG. 1, a globally distributed infrastructure 100 enables efficient and scalable processing and compositing of media streams by building the MCUs as the media processing nodes (e.g., 102, 104, 106, 114, and 122) for video stream processing from off-the-shelf components, such as Linux/x86 Central Processing Units (CPUs) and PC Graphics Processing Units (GPUs) instead of custom hardware. These MCUs can be deployed in a rack-and-stack cloud-computing style and hence achieves the most scalable and cost/performance efficient approach to support the video conferencing service. The x86 architecture has improved vastly over the years in its Digital Signal Processing (DSP) capabilities and is able to now support the processing for the video conference system. Additionally, off-the-shelf GPU used for rendering PC graphics can be used to augment the processing power of the CPU and/or any other processor.

In the example of FIG. 1, the globally distributed infrastructure 100 that supports and enables the operations of the video conference has at least one or more of the following attributes:

(1) Ability to support wide variety of audio video formats and protocols;

(2) Scalable mixing and composition of the audio and video streams;

(3) Service delivered across the globe with minimized latency; and (4) Capital efficient to build and cost efficient to operate.

In some embodiments, globally distributed infrastructure 100 may be implemented with clusters of x86 servers both locally on a LAN as well as across geographies serving as the media processing nodes for the MCUs to achieve near unlimited scaling. All of the media processing nodes of the clusters (e.g., 102, 104, 108, 106, and 114) may work together forming one giant MCU. In some embodiments, such clustered design makes use of network layer multicast and a novel multi-bit-rate stream distribution scheme to achieve the unlimited scaling. The globally distributed infrastructure 100 is able to achieve great scalability in terms of the number of participants per call, geographic distribution of callers, as well as distribution of calls across multiple POPs worldwide.

By way of a non-limiting example, globally distributed infrastructure 100 has the media processing node MCUs distributed around the globe in POPs (e.g., United States (US) Network POP 102, US Core Media POP 104, Asia Pacific (APAC) Media POP 106, APAC Network POP 114, and European Union (EU) Core Media POP 122) at data centers (e.g., third party data centers) to process video conference feeds coming from video conference endpoints having different communication protocols and/or using different client applications from communication service providers. Those with skill in the art will recognize that an implementation of the globally distributed infrastructure 100 for the video conference system with the same number and/or geographic locations for Core Media and/or Network POPs of FIG. 1 is not required and any number of Core Media POPs and Network POPs may be used to provide a content delivery network 103 for a video conference system. In some embodiments, each Core/Media POP may have the processing power (e.g., servers) to handle the load for that geographical region where the POP is located. Users/participants connecting to the video conference system may be directed to the closest Core Media POP (e.g., the "connector" at a POP, described in more detail with FIG. 2) that can handle the processing for the conference so as to allow them to minimize their latency.

Once the participants are in communication with a POP of the globally distributed infrastructure 100, their conference feeds of audio and video streams can be carried on a high performance network POPs (e.g., US Network POP 102, APAC Network POP 114) between the POPs. Additionally, in some embodiments, Network POPs (e.g., US Network POP 102, APAC Network POP 114) can be used for communication (e.g., traffic) with users in places where a Core Media POP does not exist. By way of example, an endpoint can communicate with a Network POP in a more optimal location for communication than the nearest Core Media POP, and the Network POP may send/forward the traffic to a Core Media POP over a private dedicated network so as to avoid use of the open Internet. The globally distributed infrastructure 100 enables media processing nodes to act as one single system.

FIG. 1 depicts an example of a system for media stream distribution processing that may be achieved locally on a Local Area Network (LAN) present in each POP and/or across multiple POPs on the Wide Area Network (WAN). For example, media stream distribution may be handled with a single node media distribution using a single POP (as shown with the use of server 108), where video conference feeds from participants to a video conference via for non-limiting examples, room systems running H.323 (as shown with 110), PCs running H.323, PCs running Skype (as shown with 112), all connect to one node in a POP (as shown with 108) based on proximity to the conference host, where the video conference feeds are load balanced but not clustered among nodes in the POP. In another example, media stream distribution may be handled with clustered nodes media with a POP (as shown with 104), wherein video conference feeds from the participants (e.g., 110, 112, and 116) are load balanced among cluster of nodes at the POP, and the audio/video streams are distributed/overflowed among the nodes in the POP. In another example, media stream distribution processing may be handled with complete media distribution among both the cluster of nodes within the POP (e.g., 104) and among different POPs (e.g., 102, 106, 114, and 122) as well, where some participants to the conference may connect to their closest POPs (e.g., 118 and 120 connect to 122, and 124 connects to 106) instead of a single POP.

In some embodiments, the globally distributed infrastructure 100 may have multiple other globally distributed private networks to connect to it, including, but not limited to, deployments of video conferencing services such as Microsoft Lync that require federation (i.e. cooperation among multiple organizational entities) at edge nodes and translation and decoding of several communication and transport protocols.

Figure 2:
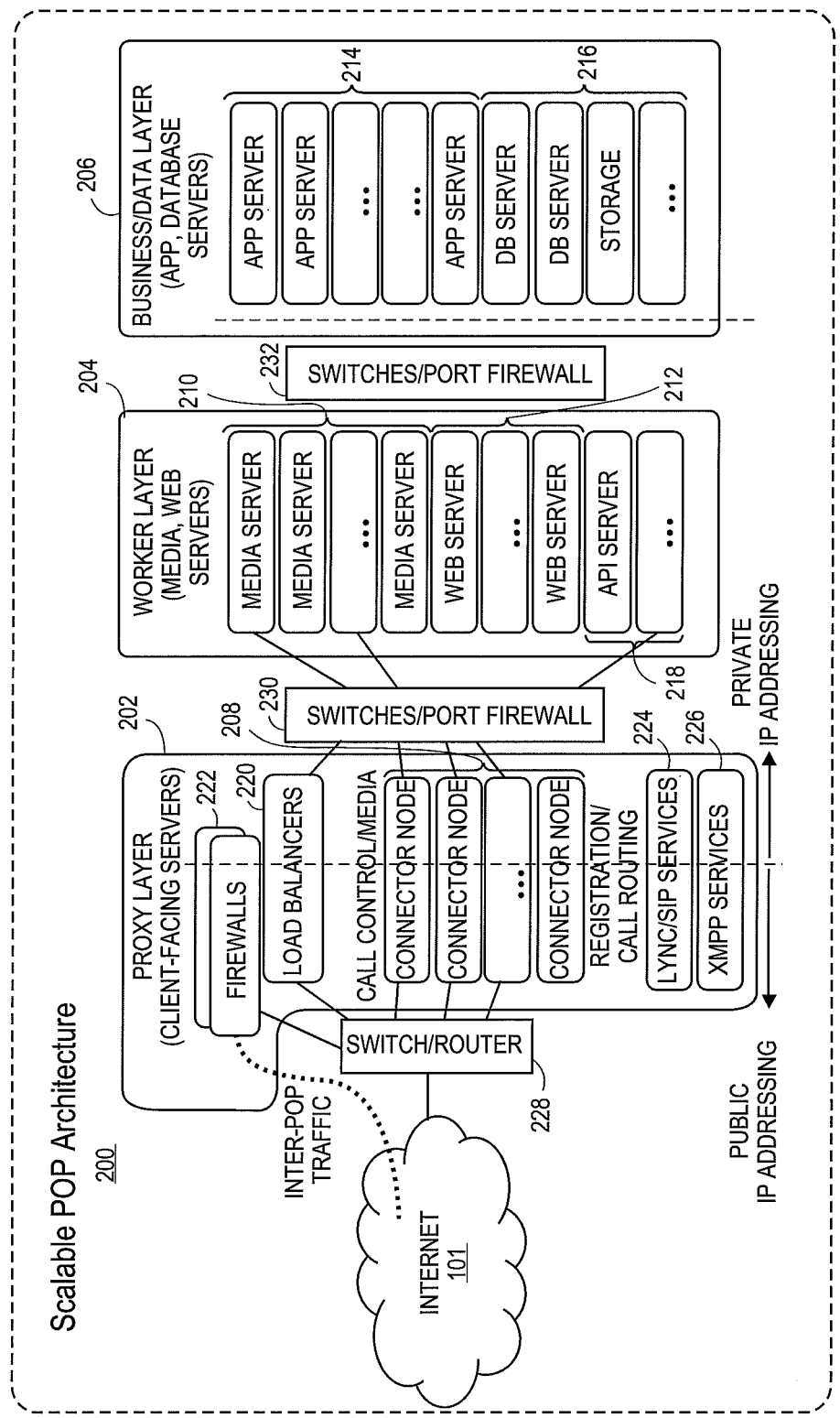
FIG. 2 depicts an exemplary scalable point of presence (POP) architecture, in accordance with some embodiments of the invention.

FIG. 2 depicts an exemplary system in accordance with some embodiments of the invention. FIG. 2 depicts a Scalable POP Media Processing Node Architecture 200 (e.g., architecture for POPs 102, 104, 106, 114, and 122) accessible over a network 101 with a Proxy Layer 202, a Worker Layer 204, and a Business/Data Layer 206. Some of the components/elements of the Scalable POP Architecture 200, include but are not limited to, the following: load balancers 220, firewalls 222, media servers collectively 210 for processing data streams (e.g., transcoding, compositing, mixing and/or echo cancellation among H.26x, G.7xx, and SILK), protocol connector nodes collectively 208 for handling call and/or media processing control for endpoints of video conference (e.g., for H.323, Skype, SIP, XMPP, and NAT traversal), servers for handling particular communication services or protocols (e.g., LYNC, SIP services 224, and XMPP services 226), web servers collectively 212, application programming interface (API) servers 218, data storage collectively 216 (e.g., database (DB) servers and other storage), and applications servers collectively 214 for supporting web applications (e.g., for providing functionality to the user, such as conference control, screen and presentation sharing, chat, etc.). The components may be distributed across the nodes and/or POPs of the globally distributed infrastructure 100 for enabling real-time or nearly real-time communication. Components may be connected on a network and can communicate over networks utilizing switches and routers as shown with 228, 230, and 232.

Some components, which include, but are not limited to, the following components: user/account management, billing system, NOC (Network operation center) systems for bootstrapping, monitoring, and node management may be run at one or more centralized but redundant management nodes in the Business/Data Layer 206. Other components, which include but are not limited to, common application framework and platform (e.g., Linux/x86 CPUs, GPUs, package management, clustering) can be run on both the distributed nodes and the centralized management nodes.

Each of the protocol connector nodes 208 in the Proxy Layer 202 may receive audio video data streams utilizing proprietary or standards based communication protocols and may translate the received data into a common protocol (e.g., Real Time Transport Protocol (RTP)). The received data in the common protocol may then be sent to media servers for transcoding and composition/mixing by media servers 210 of the Worker Layer 204, such operation of the media servers 210 used to form composite data streams for the endpoints. Translating (when needed) may include receiving the data packets of a data stream communicated using a first communication protocol and retransmitting the received data packets using a second communication protocol. While the communication protocol in which the data stream is communicated is changed, the actual data packets may remain unchanged. In contrast, transcoding (when needed) may include decoding data (e.g., data packets) in a received first communication protocol to an intermediate format and encoding the data into a common target format for a common, target communication protocol. Other implementations may provide for transcoding to be performed at the proxy layer 202 with a protocol connector node 208.

In some embodiments, global infrastructure 100 provides a high-level mechanism for fault tolerant protocol handling to prevent improper input from causing instability and possible security breach via protocol connector 208 or media servers 210. Media processing tasks by protocol connectors 208 and/or media servers 210, such as processing of protocol control messages and compressing audio and video streams may be isolated in one or more separate, independent, unprivileged processes. More specifically, (1) Separate processes: each incoming connection may cause a new process to be created by protocol connector node 208 or media server 210 to handle it. This process may be responsible for decompressing the incoming media stream, translating the incoming control messages into internal API calls, and decompressing the media into an internal uncompressed representation. For a non-limiting example, inbound H.264 video can be converted into YUV420P frames before being passed on to another process. In this way, if this process crashes, no other part of the system may be affected except the conference endpoint handled by that process.

(2) Independent processes: each connection may be handled in its own process. A given process in a protocol connector node 208 or media server 210 may be responsible for one videoconference endpoint, so that if this process crashes, only that single endpoint will be affected and everyone else in the system will not notice anything.

(3) Unprivileged processes: each process should be as isolated as possible from the rest of the system. In some embodiments, to accomplish this, ideally each process runs with its own user credentials, and may use the chroot( ) system call to make most of the file system inaccessible.

(4) Performance considerations: protocol connector 208 or media server 210 may introduce several processes where typically only one exists and brings about the possibility of performance degradation, especially in a system handling audio and video streams where a large amount of data needs to be moved between processes. To that end, shared memory facilities can be utilized to reduce the amount of data that needs to be copied.

In some embodiments, media-processing servers 210 are designed to convert and compose several videoconference feeds of video and audio streams in real-time to create and render one or more composite multimedia streams for each participant to the video conference (e.g., VMR). Media-processing servers 210 may include as its components one or more of: video compositor, video transcoder, distributed multicast video switch, audio transcoder/pre-processor, distributed multicast audio mixer, and each component may be in communication with protocol connector 208 and a distributed conference session controller. In the case of video, the video streams from the participants are made available at the media processing server 210 in three (or more) forms: original compressed video, uncompressed raw video, and a lower resolution compressed thumbnail video.

By way of example, a video compositor of a module executing on a media processing node 210 subscribes to whichever video stream it needs based on the set of videos needed to compose and be rendered to the participants. The two (or more) compressed forms of the video streams listed above may be transcoded by video transcoder sent by distributed multicast video switch using a multicast address on the network so that other (remote) media processing nodes that want these video streams can subscribe to them as needed. This scheme allows the entire cluster of nodes (locally and globally) to share and/or exchange the audio and video streams they need in the most efficient manner. These streams could be transmitted over the public Internet, over a private network or over a provisioned overlay network with service level guarantees. Using this approach, video compositor may show various composites, including but not limited to, just the active speaker, two people side-by-side if they are having a conversation, and any other custom format as requested by a participant, which may include transformations of the video into other representations as well. Continuing with the example, a video transcoder of media processing server 210 encodes and decodes composite video streams efficiently, where characteristics of each individual stream can be extracted during decoding.

In some embodiments, video compositor not only composes the raw video stream into a composite video stream but also builds up a composite metadata field in order to apply similar operations (including both 2D and 3D operations) outlined in the metadata field to the individual video streams of the composite video. As a non-limiting example, motion vectors need to be applied with the same transformation that video compositor may apply to each raw video stream, including but not limited to, scaling, rotation, translation, shearing. This metadata could be used for other non-real-time multimedia services including but not limited to recorded streams and annotated streams for offline search and indexing.

In some embodiments, application server 214 (e.g., a user experience engine) renders multimedia content including but not limited to the composite audio/video stream to each of the participants to the video conference for an enhanced User Experience (UE) for the participants. The UE provided by the application server 214 to the participants may comprise one or more of the following areas:

(1) Physical interaction with the video conference endpoint. The application server 214 provides a web application that enables controlling the setup and management of a multi-party video conferencing session in a device/manufacturer independent way. Most of the physical interaction with the manufacturer supplied remote control can be subsumed by a web application, wherein the web application can be launched from any computing or communication device, including laptop, smart phones or tablet devices. In some embodiments, these interactions could be driven through speech or visual commands as well that the Internet/cloud based software recognizes and translates into actionable events.

(2) User interface (UI) associated with a web application allows the participants to interact with the video conference system for video conference session. Here, application server 214 controls the interaction of the moderator and the conferencing participants. Through an intuitive UI provided by application server, participants to the video conference can control such features such as video layouts, muting participants, sending chat messages, screen sharing and adding third-party video content.

(3) Video/Multimedia content. Application server 214 controls content rendered in the form of screen layouts, composite feeds, welcome banners, etc. during the video conference as well as what the participants see when they log into a video conference, what they physically see on the screen etc. In some embodiments, the UI and/or the multimedia content could contain information related to performance metrics for the participant's call experience, including but not limited to video resolution, video and audio bitrate, connection quality, packet loss rates for the connection, carbon offsets gained as a result of the call, transportation dollars saved and dollars saved in comparison to traditional MCU-based calls.

(4) Customization of the video conference session for a specific (e.g., vertical industry) application. Application server 214 allows customization of the user interface in order to tailor a video conference session to the needs of a particular industry so that the conference participants may experience a new level of collaboration and meeting effectiveness. Such vertical industries or specialties include but are not limited to, hiring and recruiting, distance learning, telemedicine, secure legal depositions, shared-viewing of real-time events such as sports and concerts and customer support.

(5) Personalization of the video conference as per the moderator's and/or the participants' preferences and privileges. Application server 214 provides the moderator the ability to personalize the meeting when scheduling a video conference. Examples of such customization include but are not limited to, the initial welcome banner, uploading of meeting agenda, specifying the video layouts that will be used in the session and privileges given to the session participants.

Despite the fact that most conventional video conference systems cost tens of thousands of dollars, they offer very limited freedom and flexibility to the call organizer or to any participants in terms of controlling the user experience during the call. The layouts come pre-configured to a select few options, and the settings that can be modified during a call are also limited.

In some embodiments, application server 214 provides moderator-initiated in-meeting/session management and control over security and privacy settings during a particular video conference call, wherein such management and control features include but are not limited to, muting a particular speaker at the video conference, controlling and/or broadcasting layouts associated with one of the video conference endpoints to all or a subset of the participants, and sharing additional materials selectively with a subset of the participants (for a non-limiting example, in an HR vertical application where multiple interviewers are interviewing one candidate in a common call).

By offering the video conferencing service over the Internet/cloud, application server 214 eliminates a lot of these limitations of the conventional video conference systems. For a non-limiting example, application server 214 enables participant's associated different types of video conference endpoints to talk to each other over the Internet during the video conference. For a non-limiting example, participants from H.323 endpoints can to talk to participants from desktop clients such as Skype, and both the moderator and the participants can choose from a wide variety of options. In addition, by providing the ability to terminate the service in the cloud, application server 214 enables access to a much richer set of features for a conference call that a participant can use compared to a conventional passively bridged conference call. More specifically, every participant can have control of one or more of:

(1) Which active participants to the session to view in his/her video windows on the screen of his/her video conference endpoint.

(2) Layout options for how the different participants should be shown on the screen of his/her video conference endpoint.

(3) Layout options on where and how to view the secondary video channel (screen sharing, presentation sharing, shared viewing of other content) on the screen of his/her video conference endpoint.

Using such in-meeting controls, a moderator can control security and privacy settings for the particular call in ways. The moderator of the call, in addition to the aforementioned options, has a richer suite of options to pick from through a web interface to manage and control the video conference, which include but are not limited to, (1) Muting subsets of participants during a call.
(2) Sharing content with subsets of participants during the course of a call.
(3) Prescribing a standard layout of the screen of his/her video conference point and a set of displayed callers for other participants to see.

(4) Choosing to display caller-specific metadata on the respective video windows of a subset of the participants, including user-name, site name, and any other metadata.

(5) Easy and seamless way to add or remove participants from the video conference call through a real-time, dynamic web interface.

(6) Easily customizable welcome screen displayed to video callers on joining the call that can display information relevant to the call as well as any audio or video materials that the service provider or the call moderators wishes for the participants to see.

In some embodiments, application server 214 enables private conferences by creating sub-rooms in main VMR that any subset of the participants to the main VMR could join and have private chats. For a non-limiting example, participants can invite others for a quick audio/video or text conversation while being on hold in the main VMR.

A shared experience of events among participants to a video conference often requires all participants to be physically present at the same place. Otherwise, when it happens over the Internet, the quality is often very poor and the steps needed to achieve this are quite challenging for the average person to pursue this as a viable technological option.

In some embodiments, application server 214 provides collaborative viewing of events through VMRs that can be booked and shared among the participants so that they are able to experience the joy of simultaneously participating in an event and sharing the experience together via a video conference. For a non-limiting example, the shared event can be a Super Bowl game that people want to enjoy with friends, or a quick session to watch a few movie trailers together among a group of friends to decide which one to go watch in the theater.

In some embodiments, application server 214 utilizes the MCUs of the global infrastructure 100 to offer an easy, quick, and high-quality solution for event sharing. More specifically, application server 214 enables one initiating participant to invite a group of other participants for a shared video conference call via a web application. Once everyone joins in the VMR to share online videos and content, an initiating participant may provide a uniform resource locator (URL) where the content is located and the content may be streamed into a VMR directly from the content source whether the content is local to the initiating participant device or located remotely and accessed over the Internet from a third party web site or content store. Participants may continue to have conversations with other participants while watching this content. Other features provided include but are not limited to, altering the layout of the content in terms of where it is visible, its audio level, whether it should be muted or not, whether it should be paused or removed temporarily are in the control of the person sharing the content similar to the management and control by a moderator to a video conference as discussed above. Such an approach provides a compelling and novel way to watch live events among groups of people whose locations are geographically distributed, yet want to experience an event together. This enables a whole new set of applications around active remote participation in live professional events such as conferences and social events such as weddings.

In some embodiments, application server 214 enables multiple views and device-independent control by the participants to the video conference. Here, the video endpoints each have its own user interface and in the case of hardware video systems available in conference rooms, the video conference endpoints may each have a remote control that is not very easy to use. In order to make the user experience of connecting to the VMR simple, user experience engine 106 minimizes the operations that one need to carry out using the endpoints' native interface and moves all of those functions to a set of interfaces running on a device familiar to most users—desktop PC, laptop PC, mobile phone or mobile tablet, and thus makes the user experience to control the VMR mostly independent of the endpoint devices' user interface capabilities. With such device-independent control of the video conference, application server provides flexibility, ease-of-use, richness of experience and feature-expansion that it allows to make the experience far more personal and meaningful to participants.

In some embodiments, application server 214 may also allow a participant to participate in and/or control a video conference using multiple devices/video conference endpoints simultaneously. On one device such as the video conference room system, the participant can receive audio and video streams. On another device such as a laptop or tablet, the same participant can send/receive presentation materials, chat messages, etc. and also use it to control the conference such as muting one or more of the participants, changing the layout on the screens of the video conference endpoints with PIP for the presentation, etc. The actions on the laptop are reflected on the video conference room system since both are connected to the same VMR hosting the video conference.

Joining a video conference from H.323 endpoints today often involve cumbersome steps, which must be performed via a remote-control for the endpoint device. In addition to logistical issues such as locating the remote in a room, there are learning-curve related issues, such as finding the correct number to call from the directory, entering a specified code for the call from the remote, etc. In some embodiments, an endpoint can be setup to always just dial one number when it is turned on or woken up from sleep. Once the call is established, then a different user interface, such as a web application or mobile device client application, can be used to select which meeting to join.

In some embodiments, application server 214 provides a user experience with a user interface rendering to the participants welcome screen content that includes, but is not limited to, the following: an interactive welcome handshake, a splash screen, interactions for entering room number related info, and a welcome video, etc. for video conferences. To join a call from a video conference endpoint, all that the moderator needs to do is to call a personal VMR number he/she subscribes to. The moderator can then setup details for the call, including the rich media content that would form part of the welcome handshake with other participants, which may then be setup as default options for all calls hosted by the moderator. Other participants call into the VMR and enter the room number specified for the conference call. On joining the VMR, they first enjoy the rich media content setup as their welcome screen, including content specific to the call, such as an agenda, names of the parties calling in, company related statistics etc. Such content could also be more generic for non-business applications, including any flash content including videos, music, animations, advertisements, etc. Upon joining the call, the display also may show a code that is specific to the participant on his/her screen, which can be applied to the content on the call for content sharing. The code can also be entered from a web application used for the call or can be provided through voice or visual commands that are recognized and processed by software in the internet cloud that are then translated into actionable events.

Figure 3:
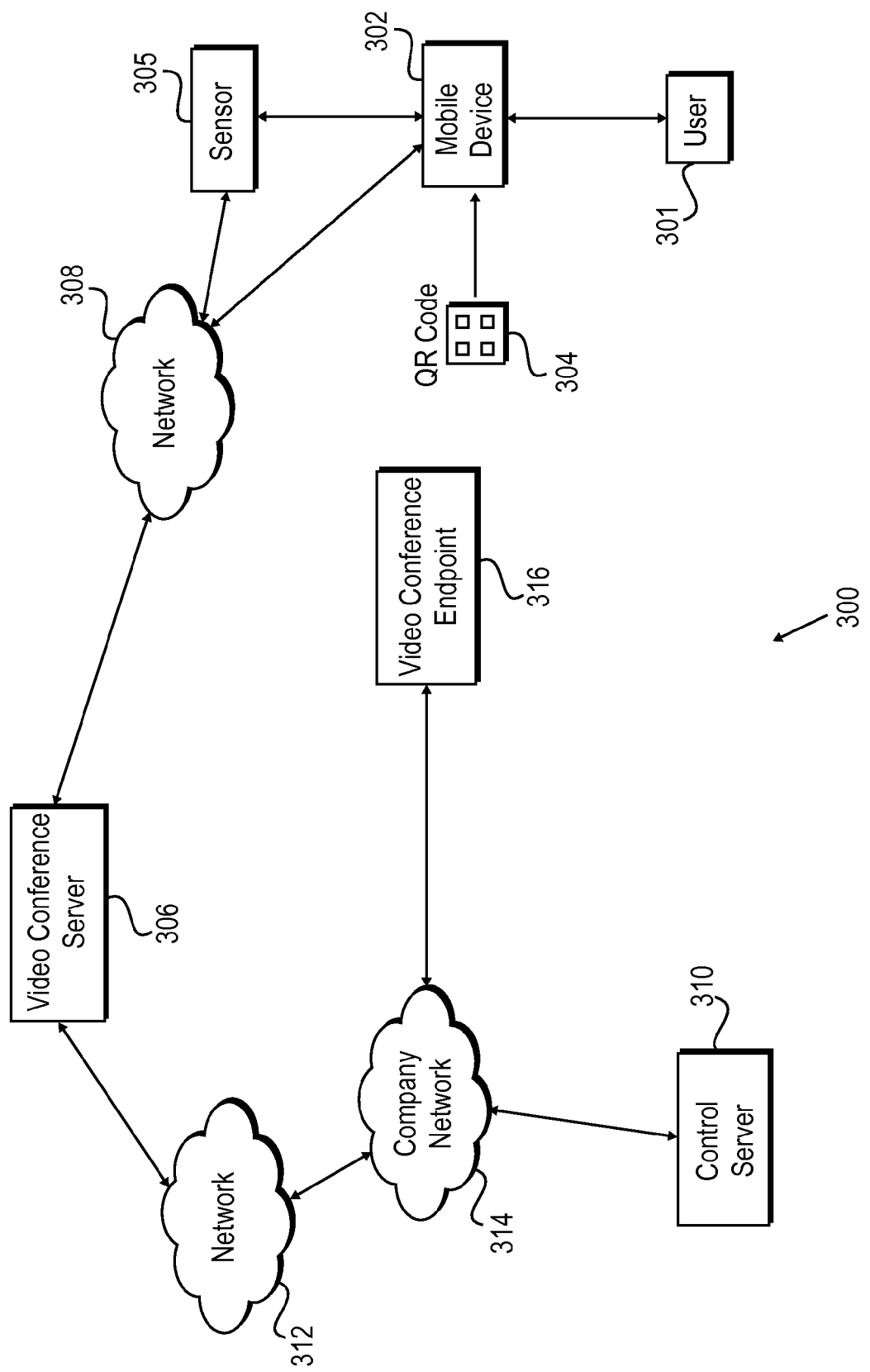
FIG. 3 depicts an exemplary video conference system, in accordance with some embodiments of the invention.

FIG. 3 depicts video conference system 300, within which techniques in accordance with some embodiments of the present invention may be employed. In a typical scenario, user 301 may need to join a video conference using a meeting identifier (ID) (and optionally a meeting passcode). At the time the video conference is about to start, user 301 may go to a conference room with video conference endpoint 316 (e.g., a room conference system). The user is then faced with the task of joining video conference endpoint 316 into the video conference. Previously, user 301 might have been required to manipulate a specialized control device of video conference endpoint 316. As mentioned above, many users may be unfamiliar with how to operate such specialized control device.

Embodiments of the present invention provide an alternative way by which user 301 can join video conference endpoint 316 into a video conference by relying upon the "presence detection" of the user. Essentially, once control server 310 receives an information signal indicating that user 301 (or mobile device 302) is in close proximity to video conference endpoint 316 (or other form of "presence information", e.g., user is present in a conference room, etc.), control server 310 can remotely connect video conference endpoint 316 into the video conference (i.e., the video conference that the user seeks to join) on behalf of the user. Some initial configuration may be required to enable control server 310 to remotely control video conference endpoint 316.

First, each video conference endpoint may need to be registered with control server 310. While FIG. 3 only depicts one video conference endpoint (i.e., endpoint 316), it is understood that there may in general be a plurality of video conference endpoints (e.g., in a company with numerous conference rooms that are each configured for video conferencing). Such registration may include storing, in a database of control server 310, an Internet Protocol (IP) address (e.g., 128.19.0.0) and physical location (e.g., conference room A, Bob's office) associated with each video conference endpoint as well as any associated authentication information required for the control server 310 to send commands to video conference endpoint 316. In other embodiments of the invention, control server 310 could be built into video conference endpoint 316 (and other video conference endpoints) if the manufacturer of the video conference endpoint is willing to make extensions to the software running inside the endpoint.

Also, as part of the initial configuration process, markers may need to be placed in each conference room (or other rooms in which video conference endpoints are located) to enable the "presence detection" of the user. For instance, a quick response (QR) code (which may encode information that identifies the conference room) may be placed in a conference room (e.g., a sticker with a QR code may be adhered onto the surface of a conference table, or the QR code could be digitally displayed on a monitor or tablet device that is placed on the conference table or located near the entrance door of the conference room). Alternatively and/or in addition, a near field communication (NFC) tag (which may encode information that identifies the conference room) may be placed in a conference room (e.g., a sticker with an NFC tag may be adhered onto the surface of a video conference monitor).

Presence detection of the user operates in accordance with the following assumption: If user 301 is able to transmit the information encoded in a QR code or an NFC tag to control server 310, it is assumed that user 301 is in close proximity to the location where the QR code or NFC tag is located.

After the initial configuration has been completed, a user may join video conference endpoint 316 to a video conference in the following manner. First, user 301 may select a particular meeting to join by communicating a meeting ID (and optionally a meeting passcode) to control server 310 using a mobile device 302 (e.g., the user's smart phone, etc.).

Then, to alert control server 310 that user 301 is in close proximity to video conference endpoint 316, user 301 may further transmit location information to control server 310. Such location information may be transmitted by scanning a QR code that encodes location information (e.g., taking a picture of a QR code using the user's smart phone) or placing an NFC reader close to an NFC tag that encodes location information (e.g., placing user's smart phone having NFC reader close to an NFC tag).

In response to receiving the meeting ID (and optionally a meeting passcode) and the location information of the user, control server 310 may identify the video conference endpoint (e.g., IP address or other identifier thereof) that is associated with the user's location information (as specified by the information encoded in the QR code or NFC tag). The control server 310 may then instruct the identified video conference endpoint 316 to connect to video conference server 306, more specifically, connect to a video conference (as specified by the meeting ID) hosted on video conference server 306.

In one embodiment of the invention, the process of transmitting the meeting ID (and optionally meeting passcode) and the information encoded in the marker to control server 310 may be facilitated by an application executing on mobile device 302. First, user 301 may select a meeting he/she desires to join on mobile device 302 (e.g., selecting a meeting URL from an Outlook™ calendar entry). In response to such selection, an application may automatically be launched on mobile device 302, the application further automatically transmitting the meeting ID (and optionally a meeting passcode) to control server 310. The application may then display a user interface on a display of mobile device 302, the user interface facilitating user 301 with the transmission of his/her location information to control server 310. For example, a user interface may help the user accurately position a camera of mobile device 302 with respect to a QR code (such that the QR code is centrally located in the camera's field of view), and upon the user selecting (e.g., touching) a control icon on the display of mobile device 302, location information encoded in the QR code may be transmitted to control server 310.

In a variation of the approach described above, the application may first assist the user with transmitting his/her location information to control server 310, before assisting the user with transmitting the meeting ID (and optionally a meeting passcode) to control server 310.

In the embodiments described above, a marker (e.g., the QR code or the NFC tag) was described to encode location information (e.g., conference room A, Bob's office), while in other embodiments, a marker may encode information other than location information. For example, the marker may encode any identifier that is associated with a video conference endpoint located in close proximity to the marker. Such identifier could be a serial number, an IP address or any binary string that is associated with a video conference endpoint. In the instance where the marker encodes the IP address of the video conference endpoint, the video conference endpoint can be registered on control server 310 by only its IP address. That is, upon control server 310 receiving an IP address from mobile device 302 (the IP address detected from the marker), the control server 310 can instruct the video conference endpoint at that IP address to join a video conference. This would eliminate the step (during the initial configuration) of corresponding information encoded by the marker with the IP address of the video conference endpoint, as the information encoded by the marker is already the IP address of the video conference endpoint.

In other embodiments, means other than a QR code or an NFC tag may be employed in order to transmit location information to control server 310. For instance, the application may simply prompt the user to enter a room ID, a room PIN or an endpoint ID via a keyboard interface of mobile device 302. In another embodiment, no action on the part of user 301 may be needed to transmit location information to control server 310. The mere presence of mobile device 302 in the proximity of sensor 305 (i.e., a sensor located in close proximity to a video conference endpoint) may alert control server 310 that user 301 is in close proximity to a video conference endpoint (e.g., either sensor 305 or mobile device 302 may send the alert to control server 310 in response to mobile device 302 being in the proximity of sensor 305). Such form of presence detection may be facilitated by Bluetooth LE (BLE).

Further details regarding some embodiments of the invention are provided below. In one embodiment of the invention, the user launches an application on mobile device 302, and places mobile device 302 in close proximity to an NFC marker that identifies the room. In another embodiment of the invention, the user uses mobile device 302 to scan a QR code that identifies the room. Such actions by the user may immediately connect to the meeting that the user desires to be in with no further action required by the user. There is no need for using a specialized remote control or touch panel. Instead, the user can just use his/her own mobile/laptop device and join a meeting on a large screen conferencing endpoint.

A user can join a video conference from any room that has a video conference endpoint that is registered with control server 310. Control server 310 can determine that a particular user is in a particular room upon receiving an identifier of the user's mobile device along with location information generated by scanning a QR code or an NFC tag that is physically present in the room. Other sensor technologies can be used in future, but QR and NFC are the best possible today since many mobile devices have cameras that can scan QR codes and NFC sensors that can communicate with NFC tags. Bluetooth LE is also becoming common place and can be used for this purpose nowadays. Other such sensor technologies may be available in future and can be used as long as they are easy to deploy in the proximity of video conference endpoints and can be read/detected by mobile devices.

In one embodiment of the invention, video conference endpoint 316 may be connected to video conference server 306 via company network 314 and network 312. Next to a table in the conference room or next to video conference endpoint 316 may be QR code 304. In one embodiment of the invention, a user may use his/her mobile device 302 to select (e.g., click) a URL from a meeting invite, may launch an application on mobile device 302, and may then scan QR code 304 or place mobile device 302 in close proximity to an NFC tag. As soon as the QR code is scanned (or the NFC tag is read), mobile device 302 may send a first command to video conference server 306 (via network 308), which in turn sends a second command to control server 310 in the user's premises (via network 312 and company network 314). Control server 310 may determine that information generated by scanning QR code 304 (or reading the NFC tag) corresponds with video conference endpoint 316, and then may instruct video conference endpoint 316 to connect into the meeting. Networks 308, 312 and 314 may be part of a wired and/or wireless network, part of a private or public network, part of a LAN, WAN and MAN, and/or part of the Internet. While three separate networks have been depicted for ease of illustration, such networks may be part of a single network.

The techniques described above may be applicable to any mobile device and video conferencing endpoint, because (i) the application can execute on any mobile device and (ii) control server 310 is designed to communicate with any type of video conference endpoint independent of the vendor of the video conference endpoint. As noted above, control server 310 could be incorporated into a video conference endpoint if the manufacturer of the video conference endpoint is willing to make extensions to the software running inside the endpoint.

The techniques described above may be used in any conference room that has a video conference endpoint. Such techniques are advantageous inasmuch as a sticker with a QR code or an NFC tag may be inexpensively and easily placed in any conference room.

Figure 4:
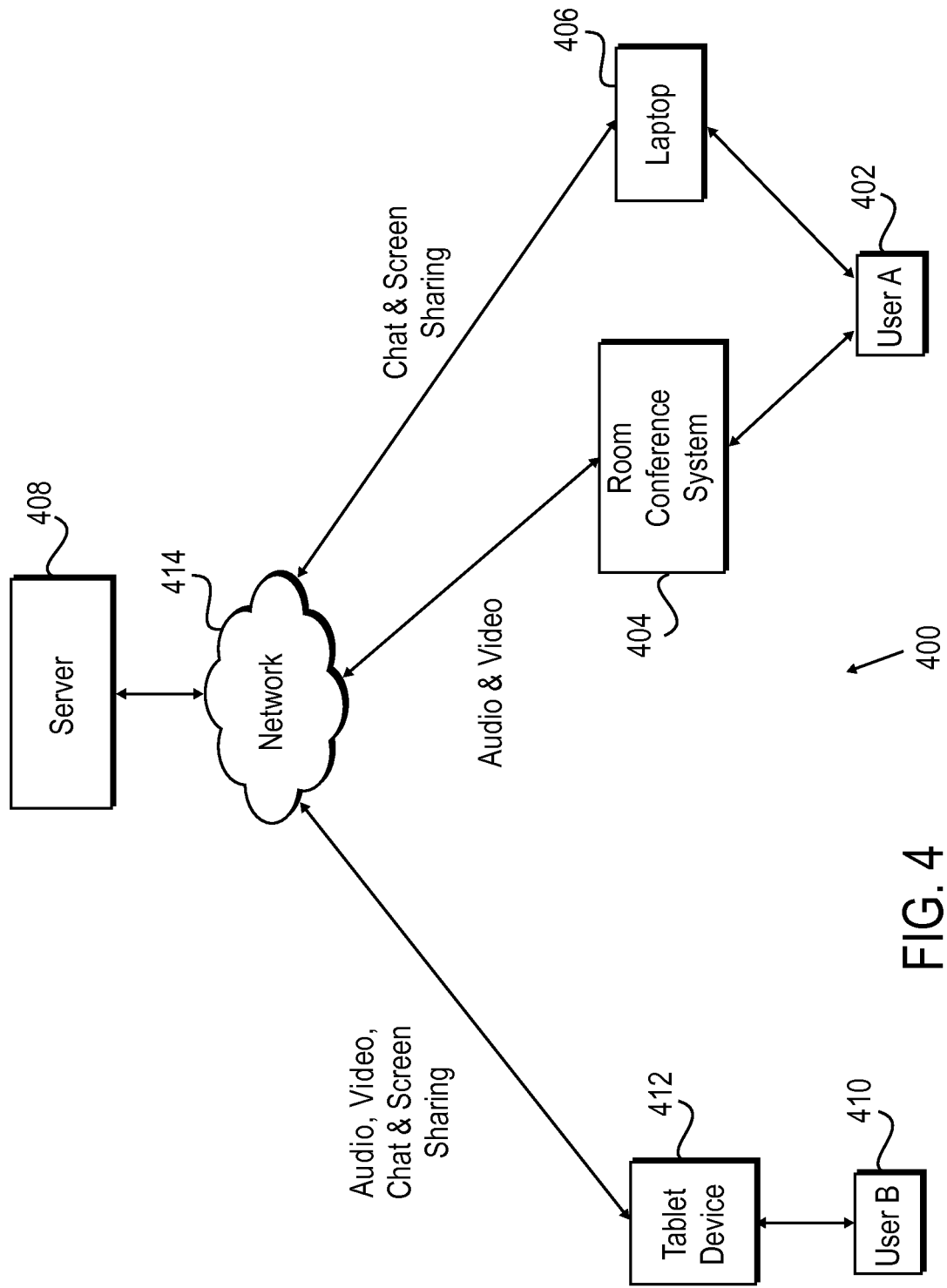
FIG. 4 depicts an exemplary video conference system, in accordance with some embodiments of the invention.

FIG. 4 now describes embodiments of the invention in which multiple electronic devices of a user can be configured as a single video conference endpoint in a video conference. As depicted in system 400 of FIG. 4, user 402 may use room conference system 404 and laptop 406 to join a video conference hosted by server 408. Server 408 may associate both devices (404, 406) with user 402, thereby configuring room conference system 404 and laptop 406 as a single endpoint. The room conference system 404 may be used by user 402 to communicate audio and video signals, while laptop 406 may be used by user 402 for chat and screen sharing.

As further depicted in FIG. 4, user 410 may use tablet device 412 to join a video conference hosted by server 408. Server 408 may associate tablet device 412 with user 410. Tablet device 412 may be used by user 410 for audio and video, as well as for chat and screen sharing.

As further depicted in FIG. 4, tablet device 412, room conference system 404 and laptop 406 may be communicatively coupled to server 408 via network 414. Network 414 may be part of a wired and/or wireless network, part of a private or public network, part of a LAN, WAN and MAN, and/or part of the Internet.

As illustrated in FIG. 4, multiple devices may form a single video conference endpoint, each device with its own set of capabilities. A user can join a video conference call with (i) a room conference system that can be used for audio and video, (ii) a tablet device that can be used for screen sharing, and (iii) a smart phone that can be used for chat, all of these electronic devices forming a single video conference endpoint. In a video conference facilitated by a room conference system with limited capabilities (e.g., no chat possible), a mobile device (e.g., mobile phone, tablet computer, laptop computer, etc.) can be used to supplement the capabilities of the room conference system (e.g., provide chat).

In another embodiment of the present invention, a user may communicate via the multiple modes of audio, video, content sharing and/or chat without establishing multiple endpoints. That is, server 408 may configure all of the electronic devices that are associated with the same user as a single endpoint, and accordingly is able to manage the set of electronic devices associated with each user as one endpoint for various moderator controls such as mute, unmute, chat, etc.

Server 408 may support a set of capabilities, such as audio, video, chat, screen sharing and the like, for each user. A user can join a video conference with a first device that is capable of supporting audio/video and a second device that is better suited for content sharing and chat. Server 408 may associate a first user with both the first and second devices, and consequently can determine the communication modes (i.e., audio, video, content sharing and chat) that are associated with the first user.

The user may identify himself/herself at the time of joining a video conference with a device, by pairing the device with another device already joined into the video conference. Pairing may be achieved using a short alphanumeric code, as described in U.S. patent application Ser. No. 13/105,719. For instance, after a first user joins a video conference using a first device, server 408 may provide the first user with a short alphanumeric code that can be used to associate any further devices that join the video conference with the first user. That is, the first user can join a second device into the video conference by entering the short alphanumeric code on the second device; the second device may then provide the short alphanumeric code to server 408; and server 408 may then associate both the first and second devices with the first user.

Pairing may also be achieved using other techniques such as QR codes, NFC tags or other sensor technology. For instance, after a first user joins a video conference using a first device, server 408 may provide the first user with a QR code that can be used to associate any further devices that join the video conference with the first user. That is, the first user can join a second device into the video conference by scanning the QR code with the second device; the second device may then provide information derived from the QR code to server 408; and server 408 may then associate both the first and second devices with the first user.

In addition and/or alternatively, pairing may be heuristically determined by the server. For instance, server 408 may detect similar audio signals (e.g., similarity being measured based on the correlation between two signals) being received from a first device and a second device. As such correlation may indicate two devices being used by the same user, server 408 may then associate the first and second devices with the same user (and/or with the same video conference endpoint). Further description on the heuristic pairing of devices may be found in U.S. patent application Ser. No. 13/105,719.

In the foregoing description, certain flow diagrams have been shown and processes described in relation to those flow diagrams that provide a reference for discussion purposes. In an actual implementation of the methods of the present invention, the steps can comprise event-driven routines that can run in parallel and can be launched and executed other than as shown by the simple depiction in the flow diagrams. In short, the particular order of the steps in the flow diagrams is illustrative of the invention, but not limiting of the various permutations that can be achieved in a given embodiment. Accordingly, it is the performance of the steps recited in the claims appended below which is pertinent, and not the order of operation of the steps themselves.

Figure 5:
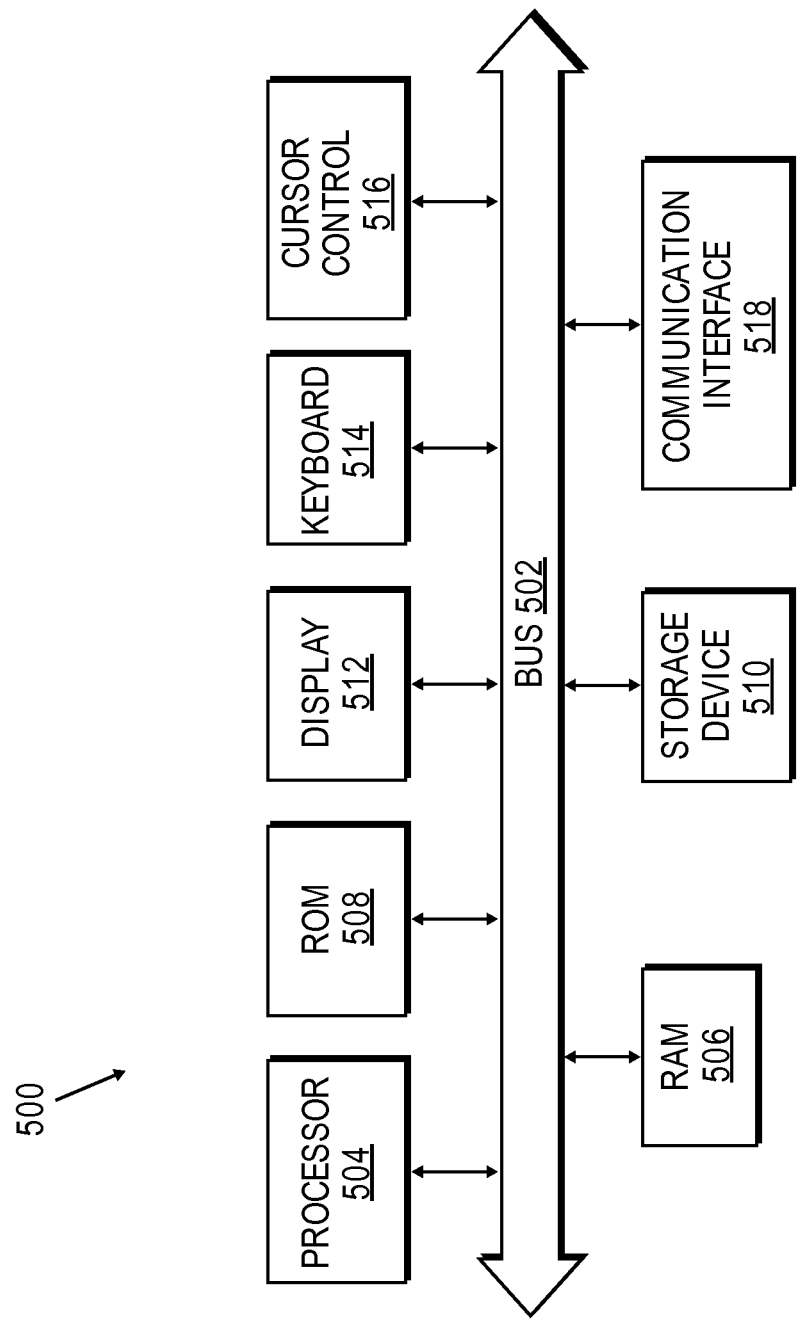
FIG. 5 depicts components of a computer system in which machine-readable instructions instantiating the methods of the present invention may be stored and executed.

Further the procedures described herein may involve the use of various computer systems and computer readable storage media having computer-readable instructions stored thereon. FIG. 5 provides an example of a computer system 500 that is representative of any of the computer systems or electronic devices discussed herein. Note, not all of the various computer systems may have all of the features of computer system 500. Computer systems such as computer system 500 may be referred to by other names, for example, as endpoints, hand-held devices, mobile devices, smart phones, multiprocessor systems, microprocessor-based electronic devices, digital signal processor-based devices, networked computer systems, minicomputers, mainframe computers, personal computers, servers, clients, laptop computers, tablet computers, and the like. Such labels are not critical to the present invention.

Computer system 500 includes a bus 502 or other communication mechanism for communicating information, and a processor 504 coupled with the bus for processing information. Computer system 500 also includes a main memory 506, such as a random access memory (RAM) or other dynamic storage device, coupled to the bus for storing information and instructions to be executed by the processor. Main memory 506 also may be used for storing temporary variables or other intermediate information during execution of instructions to be executed by processor 504. Computer system 500 may further include a read only memory (ROM) 508 or other static storage device coupled to the bus for storing static information and instructions for the processor 504. A storage device 510, which may be one or more of a hard disk, flash memory-based storage medium, or other storage medium, may be provided and coupled to the bus 502 for storing information and instructions (e.g., operating systems, applications programs and the like).

Computer system 500 may be coupled via the bus 502 to a display 512, such as a liquid crystal or light emitting diode display, for displaying information to a user. An input device 514, such as a keyboard including alphanumeric and other keys, may be coupled to the bus 502 for communicating information and command selections to the processor. In some embodiments, the keyboard will be a software construct rendered via a touch screen display 512. Another type of user input device is cursor control device 516, such as a mouse, a trackball, cursor direction keys, and/or any other input device for communicating direction information and command selections to processor 504 and for controlling cursor movement on the display. Where a touch screen display is used, cursor control functions may be implemented using finger-based gestures directly on the display. Other user interface devices, such as microphones, speakers, etc. are not shown in detail but may be involved with the receipt of user input and/or presentation of output.

The processes referred to herein may be implemented by processor 504 executing appropriate sequences of computer-readable instructions contained in main memory 506. Such instructions may be read into main memory from another computer-readable medium, such as storage device 510, and execution of the sequences of instructions contained in the main memory may cause the processor to perform the associated actions. In alternative embodiments, hard-wired circuitry or firmware-controlled processing units (e.g., field programmable gate arrays) may be used in place of or in combination with processor 504 and its associated computer software instructions to implement the invention. The computer-readable instructions may be rendered in any computer language including, without limitation, C#, C/C++, assembly language, markup languages (e.g., HTML, SGML, XML, VoXML), JavaScript, and the like, as well as object-oriented environments such as the Common Object Request Broker Architecture (CORBA), Java™ and the like. In general, the flow diagrams are intended to be illustrative of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying" or the like, refer to the action and processes of an appropriately programmed computer system, such as computer system 500 or similar electronic computing device, that manipulates and transforms data represented as physical (electronic) quantities within its registers and memories into other data similarly represented as physical quantities within its memories or registers or other such information storage, transmission or display devices.

Computer system 500 may also include a communication interface 518 coupled to the bus 502. Communication interface 518 may provide a two-way data communication channel with a computer network, such as a network, which provides connectivity to and among the various servers and/or client devices discussed above. For example, communication interface 518 may be a local area network (LAN) card (wired and/or wireless) to provide a data communication connection to a compatible LAN, which itself is communicatively coupled to the Internet through one or more Internet service provider networks. The precise details of such communication paths are not critical to the present invention. What is important is that computer system 500 can send and receive messages and data through the communication interface 518 and in that way communication with hosts and/or client devices accessible via the Internet. Computer system 500 may include additional capabilities and facilities, such as a power unit, which may comprise a battery, a power port, one or more antennae, one or more data ports, and one or more wireless communication modules. The various databases described herein are computer-based record keeping systems. Stated differently, these databases are each a combination of computer hardware and software that act together to allow for the storage and retrieval of information (data). Accordingly, they may resemble computer system 500, and are often characterized by having storage mediums capable of accommodating significant amounts of information.

While the preferred embodiments have been shown and described, it will be understood that there is no intent to limit the invention by such disclosure, but rather, is intended to cover all modifications and alternate constructions falling within the spirit and scope of the invention.

What is claimed is:

1. A method, comprising:
   receiving, at a server used to host a video conference, a first signal from a mobile device, the signal including information content derived from a marker perceived by the mobile device, wherein the marker comprises one or more of a quick response (QR) code and a near field communication (NFC) tag;
   determining, by the server, a room conferencing system that is associated with the information content included in the first signal from the mobile device; and
   instructing, in response to the first signal, by the server, the room conferencing system to automatically join the video conference hosted by the server.

2. The method of claim 1, wherein prior to receiving the first signal from the mobile device, receiving, at the server, a meeting identifier from the mobile device.

3. The method of claim 2, wherein prior to receiving the first signal from the mobile device, receiving, at the server, a meeting passcode from the mobile device.

4. The method of claim 2, wherein in response to receiving the meeting identifier and the first signal from the mobile device, the server identifies a video conference endpoint associated with the information content derived from the marker perceived by the mobile device, and instructs the identified video conference endpoint to connect to a video conference specified by the meeting identifier hosted by the server.

5. The method of claim 2, wherein the meeting identifier is selected from a calendar entry at the mobile device.

6. The method of claim 5, wherein in response to selection of the calendar entry at the mobile device, an application is automatically launched on the mobile device to transmit the meeting identifier to the server.

7. The method of claim 6, wherein including information content derived from the marker perceived by the mobile device is captured by the application that is automatically launched on the mobile device.

8. A method, comprising:
   receiving, at a server used to host a video conference, a first signal that is associated with a room conferencing system, the first signal received upon a mobile device being located in a proximity of a sensor or a marker, wherein the marker comprises one or more of a QR code and a NFC tag; and
   instructing, in response to the first signal, by the server, the room conferencing system to automatically join the video conference hosted by the server.

9. The method of claim 8, wherein prior to receiving the first signal, receiving, at the server, a meeting identifier from the mobile device.

10. The method of claim 9, wherein prior to receiving the first signal from the mobile device, receiving, at the server, a meeting passsscode from the mobile device.

11. The method of claim 9, wherein in response to receiving the meeting identifier and the first signal, the server identifies a video conference endpoint associated with information content derived from the sensor or marker, and instructs the identified video conference endpoint to connect to a video conference specified by the meeting identifier hosted by the server.

12. The method of claim 9, wherein the meeting identifier is selected from a calendar entry at the mobile device.

13. The method of claim 12, wherein in response to selection of the calendar entry at the mobile device, an application is automatically launched on the mobile device to transmit the meeting identifier to the server.

14. The method of claim 13, wherein including information content derived from the marker perceived by the mobile device is captured by the application that is automatically launched on the mobile device.

* * * * *